United States Patent [19]

Toomey et al.

[11] 4,248,839
[45] Feb. 3, 1981

[54] CHLORINATION OF IMPURE MAGNESIUM CHLORIDE MELT

[75] Inventors: Robert D. Toomey, Salt Lake City, Utah; Brian R. Davis, Brick, N.J.; Ramaswami Neelameggham, Salt Lake City, Utah; R. Keith Darlington, Freehold, N.J.

[73] Assignee: NL Industries, Inc., New York, N.Y.

[21] Appl. No.: 61,587

[22] Filed: Jul. 30, 1979

[51] Int. Cl.³ .............................................. C01F 5/32
[52] U.S. Cl. .................................. 423/178; 13/9 R; 423/498
[58] Field of Search ................................ 423/178, 498

[56] References Cited

U.S. PATENT DOCUMENTS

| | | | |
|---|---|---|---|
| 3,067,006 | 12/1962 | Ebert et al. | 423/178 |
| 3,512,928 | 5/1970 | Lyons et al. | 423/178 |
| 3,953,574 | 4/1976 | Toomey | 423/178 |

*Primary Examiner*—O. R. Vertiz
*Assistant Examiner*—Wayne A. Langel

*Attorney, Agent, or Firm*—Gerald K. White

[57] ABSTRACT

Magnesium oxide is chlorinated in molten impure magnesium chlorine with chlorine gas by adding ferrous chloride to magnesium chloride brine, drying the brine, adding a mixture of calcined petroleum coke and charcoal to the dried brine, melting the product and chlorinating the formed melt. Ferrous chloride is added in amounts sufficient to provide from about 1.0% to 2.2% by weight of iron in the dried product. A highly reactive carbon source is added in amounts of from about 0.8 to 2.3% by weight and a carbon source that is less reactive than the highly reactive carbon source is added in amounts ranging from about 0.8 to 2.3% by weight of dried brine. Iron levels in the magnesium chloride melt may be adjusted upwardly by addition of a mixture of iron oxide and charcoal.

A melt cell characterized by side entry electrodes disposed at angles from 40° to 50°, an arched roof configuration, and an improved electrode refractory and ceramic sleeve construction is used to chlorinate the magnesium.

14 Claims, 2 Drawing Figures

CHLORINATION OF IMPURE MAGNESIUM CHLORIDE MELT

The present invention relates to a process for using gaseous chlorine to chlorinate magnesium oxide contained in molten magnesium chloride in which an iron compound and carbon function as chlorination enhancing agents. A method for adjusting iron levels in molten magnesium chloride is disclosed. The invention also relates to a melt cell using electrical resistance heating for melting magnesium chloride.

A process for producing magnesium metal and its alloys by melt electrolysis of highly pure molten magnesium chloride derived from magnesium chloride salt values of the Great Salt Lake in Utah is known. In this process, brine feeds containing high concentrations of magnesium, potassium and sodium cations, chloride and sulfate anions along with minor concentrations of lithium, calcium, bromides, carbonates and borates are successively concentrated to predominantly precipitate, sodium salts and potassium-magnesium double salts. The concentrated brines which comprise mainly magnesium and potassium chlorides are then desulfated with calcium chloride brine. At this stage, the concentration of magnesium is maintained at a sufficiently high level to permit precipitation of potassium magnesium double salts simultaneously. The desulfated brine is next deboronated and reconcentrated. The presence of borate salts impairs the current efficiency in the electrolysis of magnesium chloride and thus boron removal is required. The concentrated deboronated brine is essentially an aqueous magnesium chloride solution and is spray dried to remove water to form substantially anhydrous magnesium chloride. During spray drying of the concentrated solutions of magnesium chloride, a portion of the magnesium chloride is converted to magnesium oxide and hydrochloric acid due to reaction with water. Spray dried magnesium chloride comprises about 80 to 85% by weight magnesium chloride, from about 3% to 5% of both magnesium oxide and water, and minor concentrations of sulfates as well as sodium, potassium, calcium, and lithium salts. This material is fed into a melt cell where it becomes molten upon electrical resistance heating using graphite electrodes as the electrical heating elements and the molten material as the resistance. Chlorination is conducted simultaneously with melting. During melting, water converts magnesium chloride to magnesium oxide and hydrogen chloride. Unfortunately, magnesium oxide formed during spray drying of the concentrated magnesium chloride solution and during melting of the spray dried magnesium chloride is insoluble in the molten magnesium chloride. Should the magnesium oxide content increase beyond about 3%, the electrical resistance of the bath is increased sufficiently to impair the ability to maintain heat input which is essential to achieve adequate melting rates.

To overcome this problem, it is necessary to chlorinate the molten magnesium chloride with chlorine gas to convert the majority of the magnesium oxide to magnesium chloride. Chlorination is performed in two stages. First, the spray dried magnesium chloride is chlorinated in the melt cell during melting. Further chlorination is conducted in the double compartmented reactor cell so as to provide for multistage continuous reaction. Chlorine gas is passed into the melt through graphite lances which protrude through the top of the cell.

To improve chlorination efficiency, an iron compound and carbon should be present in the molten magnesium chloride. The iron compound accelerates the chlorination reaction by chemically reacting with the introduced gaseous chlorine to form soluble chlorides, such as ferrous chloride and ferric chloride. Chloride ions are transferred to the magnesium oxide as the oxidation state of the iron ions is changed. Carbon serves as a deoxidizing agent to remove oxygen atoms from the melt through formation of carbon oxides.

Chlorination efficiency is a function of the specific rate of reaction at different magnesium oxide levels in the molten magnesium chloride melt. Thus, the process may be advantageously conducted in three stages. The melt cell serves as the first stage. Magnesium oxide levels are maintained between about 1.2% and 1.5% during this stage with a resultant chlorination efficiency of at least 90%. The first compartment of the reactor cell serves as the second stage of the process. Magnesium oxide levels range between about 0.3% and 0.6% in this stage. The second compartment of the reactor cell serves as the third and final stage, and magnesium oxide levels are maintained between about 0.03% and 0.15% therein. Chlorine efficiency drops to about 25% to 40% in the reactor cell when both magnesium oxide and iron levels are very low. With use of the three stage design, chlorine efficiencies should be on the order of 70% or greater as contrasted with those of about 20-30% for design in which all reactions are carried out in one cell having a magnesium oxide level maintained below about 0.15%.

The use of an iron compound and carbon to increase the efficiency of the chlorination of magnesium oxide in molten salts has been described heretofore. For example, U.S. Pat. No. 3,953,574 discloses the use of iron or iron oxide additions and carbon for such purpose. In addition, an article by A. B. Bezukludnekon and V. A. Bezvuritnii, *Zhurnal Priklodnoi Khimi,* Vol. 45, No. 9, pp 1934-1938, September 1972 (USSR) discusses the chlorination of magnesium oxide in molten potassium chloride which contains iron chlorides. This process was evaluated by the rotating disk method. The article concluded that the controlling step of the chlorination process is diffusional transport of ferric iron to the disk surface and that a layer of iron oxides is formed on the surface and then is chlorinated by ferric chlorides.

In another article by A. B. Bezukladnikon et al, *Zhurnal Prikladnoi Khimi,* Vol. 47, No. 8, pp 1722-1725, August 1974 (USSR) it was shown that the rate of chlorine absorption in molten alkali chlorides is increased by a factor of one or two orders of magnitude with the addition of ferrous chloride to the melt and that an increase in ferrous chloride content raises the absorption rate.

In *Izvestiya V.U.Z., Tsvetnaya Metallurgiya,* 1964, No. 3, pp 105-113, by E. T. Sauinkova and T. L. Lukmonova (USSR), the role of a carbon addition, such as petroleum coke, in the chlorination of magnesium oxide contained in a carnallite melt was studied. It was concluded that petroleum coke is dehydrogenated with the formation of hydrogen chloride and other chlorine compounds.

To attain the purity required in the commercial production of magnesium metal, to protect the environment, and to insure efficient utilization of material added to the melt cell, the amounts of iron compound and the reactivity of the carbon should be carefully controlled. For example, to maintain the reactivity of metallic iron, U.S. Pat. No. 3,953,574 considered that it was essential that the iron content in the melt cell should not fall below 0.5% by weight and that, generally, such level should not exceed 2.75%. Moreover, higher amounts of iron than those stated above must be added to the magnesium chloride feed prior to entering the melt cell to compensate for volatilization losses of ferric chloride in the melt. Because iron content in purified magnesium is a function of iron content in the molten magnesium chloride, the iron content of the magnesium chloride should be restricted to relatively low values. In addition, particulate emissions contained in the waste gases from above the electrolytic cell are increased due to the use of high iron additions. Thus, the use of low iron contents in the molten magnesium chloride is preferred.

The present invention substantially solves the above discussed iron and carbon problems by providing a process for chlorinating magnesium oxide contained in a magnesium chloride melt which is characterized by low concentrations of iron in the melt and by the use of at least two carbon sources. It has been determined that the carbon source should comprise a highly reactive source and a less reactive source to promote reaction throughout all areas in the melt cell.

Melt and reactor cells are normally in the form of a refractory lined rectangular box having an outer metal shell. The roof of these cells is flat and normally comprised of a high strength castable refractory material. Flat roofs are subject to frequent failures because of the corrosive environment created within the cell. Graphite electrodes are employed to melt the spray dried feed and enter the cell through its sidewall at a point below the molten salt level. A ceramic sleeve is disposed around the electrode. When the electrode or sleeve deteriorates after use in the corrosive cell environment, molten salt penetrates into the cell wall and reaches the shell, thereby causing current flow to the shell which, in turn, creates localized overheating and premature failure of the shell.

In another embodiment of this invention, an improved melt cell is provided having side entry electrodes inserted at an angle of from about 40° to 50° such that the opening made in the cell wall for electrode entry is near to or just above the melt level to prevent molten salt leaks. The cell is further characterized by an arched roof design, an improved electrode refractory construction, and an improved ceramic sleeve design around the electrodes. The refractory design surrounding the electrode in prior melt cells has also proven to be unsatisfactory. A basic consideration in the electrode refractory sleeve is its resistance to the chlorine atmosphere in the cell. If such refractory is short-lived cell operation must be frequently interrupted for rebricking.

In another embodiment of this invention, a method of adjusting iron levels in molten magnesium chloride is provided by employing batch additions of an iron compound and carbon to the melt.

In accordance with the invention, magnesium oxide contained in molten magnesium chloride is chlorinated by a process which advantageously utilizes lower additions of total iron by using ferrous chloride as an iron source. The ferrous chloride is added to concentrated magnesium chloride brine prior to spray drying. This procedure eliminates metallic iron additions to the spray dried magnesium chloride feed. The invention also utilizes a mixture of a highly reactive carbon source and a less reactive carbon source as the carbon additive. This mixture is added to the spray dried magnesium chloride feed.

In practicing the invention, ferrous chloride is added to concentrated deboronated magnesium chloride brine in an amount sufficient to provide from 1.0% to 2.2% iron in the magnesium chloride following spray drying. It is preferred to provide from about 1.4% to 1.8% because such range facilitates correlation with the desired iron content in the melt cell. Ferrous chloride may be added in the form of an aqueous ferrous chloride solution or as solid $FeCl_2$. The brine is then spray-dried and combined with a mixture of about 0.8% to 2.3% by weight of a highly reactive carbon source and from about 0.8% to 2.3% by weight of a less reactive carbon source. Typical highly reactive carbon sources include charcoal, lignite, activated carbon, lampblack, and carbon black. These additives may be added in particulate form. Typical less reactive carbon sources include calcined petroleum coke and metallurgical coke. The carbon source mixture serves to promote reaction uniformity throughout the molten salt because the highly reactive source has a specific gravity such that it floats on the surface of the melt and the less reactive source has a specific gravity such that it sinks and thus is dispersed throughout the melt. The spray dried magnesium chloride containing the above reagents is then melted and chlorinated using chlorine gas in a melt cell. The amount of iron stabilizes in the melt cell during operation and ranges from about 0.70% to 0.95% by weight.

The combination of such reagents substantially solves the problems discussed above related to high total iron additions and a slow reacting carbon source. For example, charcoal is a more reactive carbon source than calcined petroleum coke and thereby diminishes the volatilization of ferric chloride from the melt at the melt surface thus assisting in maintaining the needed iron levels. Because less iron is present, less iron oxide is emitted from the system with the stack gases to the environment.

Another aspect of this invention involves a technique for adjusting the iron level in the molten magnesium chloride in the event the iron level falls below the desired 0.70% by weight. This technique comprises adding a mixture of iron oxide and charcoal to the magnesium chloride melt and then chlorinating the melt. The iron oxide/charcoal addition is believed to constitute a marked improvement when contrasted with the addition of metallic iron alone to the melt because raising iron levels with metallic iron additions is very time consuming. Moreover, because dissolution of metallic iron is dependent upon the presence of soluble iron in the melt and the amount of soluble iron is difficult to determine, control of the process is difficult. By using the above batch addition, however, the iron levels can be brought up to desired levels; e.g., from 0.75% to 0.95% in less than thirty minutes.

FIG. 1 depicts essential elements of and apparatus useful for performing the chlorination process of the invention. An aqueous magnesium chloride solution comprising brine which has been previously desulfated, deboronated and concentrated and contains about 35% to 42% by weight magnesium chloride exits from storage tank 11 through line 12 and passes through filter 13 so as to remove undissolved materials. The filtered brine is then fed to spray drier 15 for spray drying with use of forced-heated air created by burner 16 and blower 17. Alternately, hot air may be added to spray drier 15 from the hot exhaust gases of turbine 18. Spray dried magnesium chloride containing about 80% to 85% $MgCl_2$, about 3% to 5% MgO and about 3% to 5% $H_2O$ is removed from spray drier 15 by line 19. Off-gases from spray drier 15 containing particulate magnesium chloride may be passed to conventional cyclone separators (not shown) to further separate additional magnesium chloride which is combined with the spray dried magnesium chloride in line 19. Holding tank 20 containing about 25% to 30% ferrous chloride solution is fed to the magnesium chloride brine in line 14 through line 21 and metering valve 22. The amount of ferrous chloride solution added is sufficient to yield from about 1.0% to about 2.2% by weight of total iron in the spray dried magnesium chloride in line 19. Generally, the amount of solution added is from about 3% to 5% by weight based upon the magnesium chloride brine. Solid hydrated $FeCl_2$, such as $FeCl_2.4H_2O$, additions may also be used.

Figure 1:
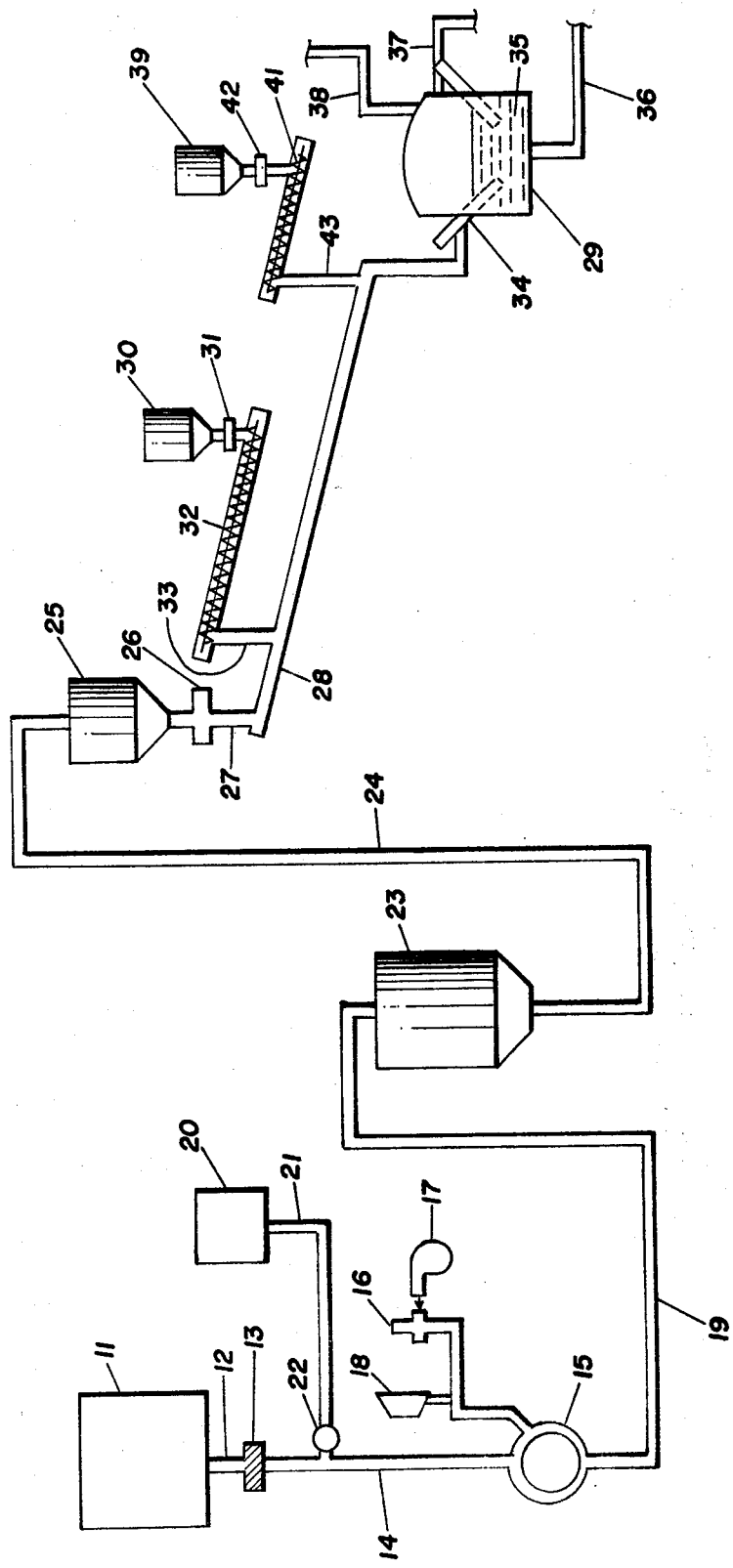
FIG. 1 illustrates a flow diagram and apparatus for the melt chlorination process of the invention.

Spray dried magnesium chloride in line 19 is stored in storage bin 23. Dry magnesium chloride is fed from storage bin 23 to holding bin 25 through line 24. Scale 26 is located below holding bin 25 for measuring and dispensing desired amounts of magnesium chloride feed to melt cell 29. The feed is passed through line 27 to screw conveyor 28 where it is conveyed to melt cell 29. A mixture of a highly reactive and less reactive carbon source is added to the magnesium chloride feed in line 28 described further below. Holding bin 30, containing a mixture of, for example, charcoal and calcined petroleum coke, is metered with use of scale 31 to screw conveyor 32 in quantities to provide from about 0.8% to 2.3% charcoal and from about 0.8% to 2.3% calcined petroleum coke based on the weight of dried magnesium chloride feed in line 28. The relative proportions of charcoal and calcined petroleum coke may be adjusted as required to provide for MgO and $H_2O$ in the spray dried magnesium chloride. Screw conveyor 32 transports the metered charcoal and coke mixture to line 33 where it is added to line 28. It would, of course, also be possible to maintain the charcoal and coke in separate bins and then combine them through appropriate metering devices to a conveyor.

Spray dried magnesium chloride containing from 1.0% to 2.2% iron, 0.8% to 2.3% charcoal, and 0.8% to 2.3% coke and from about 3% to 5% magnesium oxide and about 3% to 5% $H_2O$ is melted in the melt cell at a temperature of about 1500° to 1600° F. using graphite electrodes 34 which protrude through the cell wall into melt 35. Chlorine gas enters the cell through line 36 by passage through a graphite lance whereby chlorination of the magnesium oxide and other complex reactions occur. The gaseous by-products of the chlorination process primarily comprise HCl, unreacted $Cl_2$, $CO_2$, $FeCl_3$, gas containing entrapped $MgCl_2$ and other solids. These by-products are removed from the surface of the melt through line 37. The HCl values are recovered from the gases to produce concentrated hydrochloric acid which is in turn used to produce calcium chloride. The calcium chloride is then used to desulfate the brine during initial stages of the process. Off gases may be removed from the top of the cell 29 through line 38.

In order to insure that iron levels in melt 35 do not fall below about 0.70% by weight, a mixture of iron oxide fines and charcoal is added to the melt to adjust iron levels from storage bin 39. For example, a mixture of iron oxide and charcoal in equal weight ratios may be metered to screw conveyor 41 through scale 42 where it is fed to line 28 through line 43. Typically about 500 pounds of iron oxide and charcoal is sufficient to raise the iron content of 100,000 pounds of molten magnesium chloride from about 0.6% to 0.95% within about thirty minutes.

Figure 2:
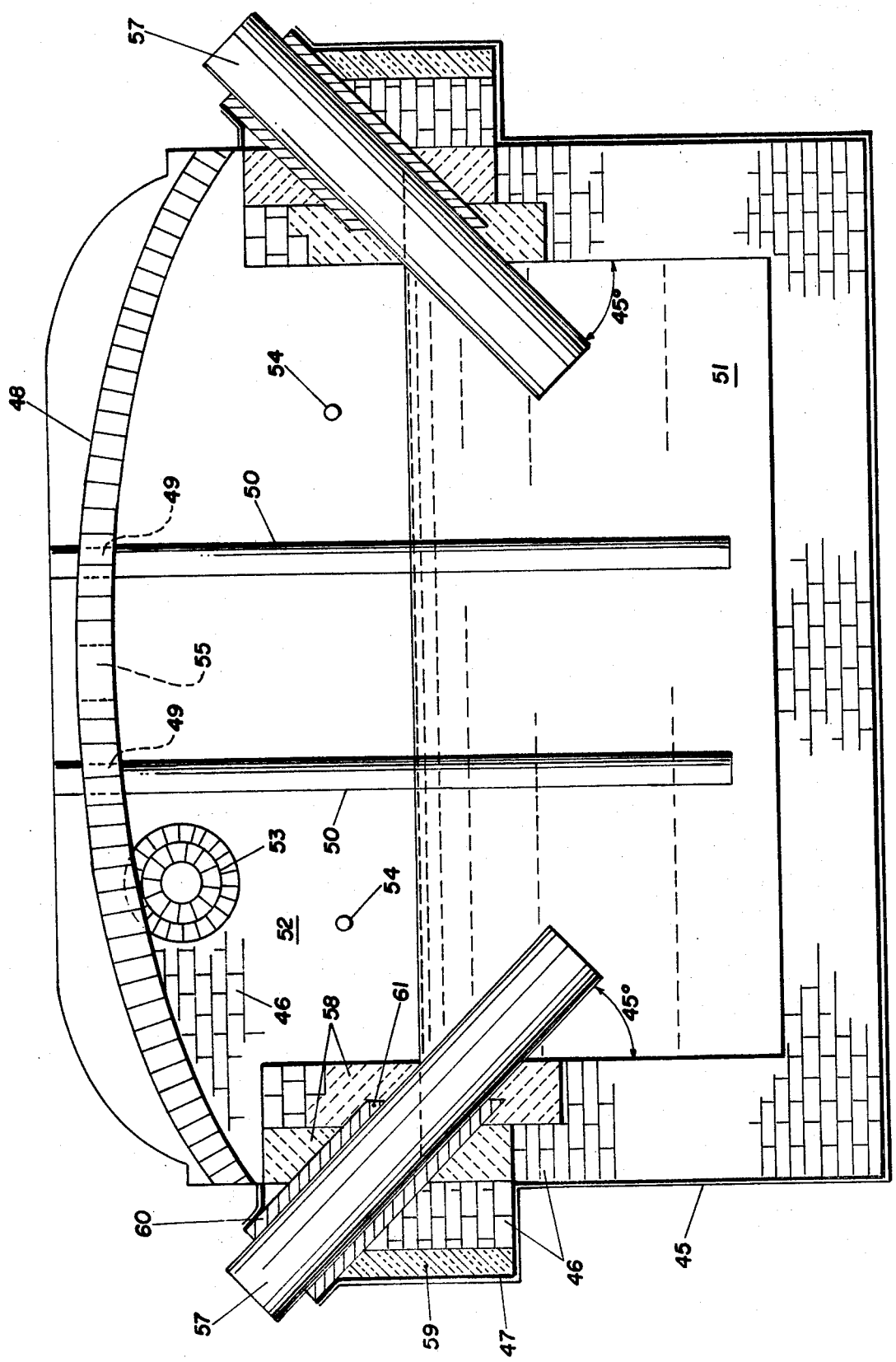
FIG. 2 depicts a cross-sectional view of the melt cell of the invention.

FIG. 2 depicts a melt cell useful for practicing the invention. The cell comprises shell 45, made of a metal such as mild steel, which encases the entire cell and is lined at its lower sides and bottom with refractory material 46. Suitable refractory materials include alumina or fireclay refractory bricks. The upper portion of the cell wall around electrodes 57 is widened to accommodate additional refractory material that is described in great detail below. A layer of insulating material, such as millboard, is disposed between shell 45 and refractory brick 46 and 47, and serves to protect the shell from overheating and provides for expansion during preheating of the cell. Roof 48 of the cell is an arched configuration of acid resistant refractory bricks. It has been found that flat castable roofs which have previously been employed in melt and electrolytic cells heretofore were subject to frequent failures due to the corrosive environment created by the melt. However, arched roofs as used herein have been found to have a useful life many times longer than the prior castable roofs. Two rows of lance ports 49 which accommodate graphite lances 50 extend through roof 48 and melt 51 and serve to introduce chlorine gas into the melt. Off-gas port 53 is located on backwall 52 of the cell near the roof for removal of the gases evolved from chlorination; i.e., HCl, unreacted $Cl_2$, $CO_2$, and $FeCl_3$ vapors. Feed port 56 is located at the center of the roof to provide for admission of spray dried magnesium chloride containing iron and carbon additions to the cell. Tapping ports 54 are located in the end wall to provide for overflow of the melt from the melt cell to the reactor cells through a refractory-lined launder. Emergency off-gas port 55 is located in the roof between lance ports 49 and may be used in the event that emergency conditions, such as rapid gas build-up in the cell, are encountered.

A pair of graphite electrodes 57 extend through the upper portion of the cell side walls at an angle of about 45° with respect to the sidewall in such a manner that the opening made in the outer portion of the wall for the electrode entry is near to or just above the melt levels as indicated by the dotted lines through the electrode. The electrodes are connected to an electrical generating means to supply current to the electrodes for heating the melt. The electrode angle may be varied from about 40° to 50° while maintaining the outer opening in the wall near to or just above the melt level. Preferably, however, this angle should be approximately 45°. The use of an inclined entry electrode configuration provides sufficient contact of the electrodes with the melt and also serves to prevent molten salt leaks to the shell of the cell.

With reference to the left-hand electrode of the cell, it may be seen that two layers of large refractory blocks 58 are disposed around the electrode from the inside of the cell side wall outwardly to about the vertical line of the lower sidewall. Extending outwardly from these blocks is a layer of acid resistant refractory brick 46 and a layer of rammed refractory plastic 59. Refractory brick layer 46 and rammed refractory plastic 59 extend outwardly to about the vertical line of entry of the electrodes. Ceramic sleeve 60 which surrounds the electrode extends from the top of the electrode to slot 61 in the outer refractory block. Because the ceramic sleeve does not extend into the melt area and because there is a section of refractory block around the electrode between the sleeve and the melt, failure of the sleeve is prevented.

The following examples further illustrate certain aspects of the invention:

EXAMPLES 1 to 3

Example 3 provides a comparison of the inventive melt chlorination procedure with two different chlorination procedures set forth in Examples 1 and 2. Each of the examples utilize iron and carbon additions.

In Example 1, 1.3% iron as ferrous chloride was introduced into an aqueous magnesium chloride solution comprising magnesium chloride brine prior to spray drying and the spray dried powder was then mixed with 1.8% metallic iron and 2.8% calcined petroleum coke and then chlorination was performed. In example 2, 1.3% ferrous chloride was introduced into magnesium chloride brine prior to spray drying. The brine was then split into three samples designated as 2(a), 2(b), and 2(c). Then 3.76% charcoal was mixed with sample 2(a), 3.81% charcoal and 0.35% ferrous chloride crystals ($FeCl_2 \cdot 4H_2O$) were mixed with sample 2(b), and 3.65% charcoal and 0.70% iron as ferrous chloride ($FeCl_2 \cdot 4H_2O$) crystals were mixed with sample 2(c). All three samples were then chlorinated. In Example 3, 1.61% iron as ferrous chloride was introduced into magnesium chloride brine prior to spray drying and the powder was then mixed with 1.22% coke and 2.03% charcoal and then chlorination was performed.

In each instance, the spray dried material was melted in a resistance heated melt cell such as described in FIG. 2 and chlorine gas was bubbled through the molten salt at weight ratios of chlorine gas to spray dried feed of from 0.267 to 0.293 as set forth in Table 1. The results are summarized in Table 1. Analysis of the spray dried feed for MgO and $H_2O$ and of the melt cell product after chlorination are also provided in the table.

As indicated in the Table 1, Example 1 lead to an excellent reduction in the amount of MgO in the spray dried feed of from 4.10 to 0.76% but the iron levels were highly unsatisfactory at 1.20%. Examples 2 (a), (b), and (c) illustrate decreasing levels of MgO in the melt cell product as the iron level in the brine increases but at the same time lead to increasing levels of iron in the melt cell product. In contrast, the present invention as embodied by Example 3, indicates a highly decreased magnesium oxide level in the melt cell product as well as optimum levels of iron. Moreover, the ratio of chlorine to spray dried feed in the Example 3 was the lowest of all Examples. This indicates the highest chlorination efficiency, i.e., the lowest magnesium oxide content for the amount of chlorine added.

EXAMPLES 4 and 5

These examples illustrate a process in which a mixture of iron oxide ($Fe_2O_3$) and charcoal were used to increase the iron content of molten magnesium chloride having an iron content below 0.70% by weight of the melt to levels greater than 1.0% in short periods of time. Equal amounts of iron oxide and charcoal were used. Chlorine feed rates in lbs/hr were varied in these examples. The results are summarized in Table 2. The above technique may be used to provide additional iron required for chlorinating MgO sludge buildup in the cell when spray dried feed is not utilized.

TABLE 1

| | | Melt Cell Additions | | | | | Analysis | | | | |
|---|---|---|---|---|---|---|---|---|---|---|---|
| | | % Fe in SDF from $FeCl_2$ | % $FeCl_2 \cdot 4H_2O$ Crystals | % Coke | % Charcoal | | SDF | | Melt Cell | | |
| Ex. | % Metallic Fe to SDF | to brine | to SDF | in SDF | in SDF | $Cl_2$/SDF | % MgO | % $H_2O$ | % MgO | % Fe | % C |
| 1 | 1.80 | 1.30 | | 2.80 | | 0.288 | 4.10 | 4.00 | 0.76 | 1.20 | 1.20 |
| 2(a) | | 1.30 | | | 3.76 | 0.271 | 4.76 | 4.00 | 2.49 | 0.77 | 1.32 |
| 2(b) | | 1.30 | 0.35 | | 3.81 | 0.293 | 4.41 | 4.17 | 1.74 | 0.92 | 1.21 |
| 2(c) | | 1.30 | 0.70 | | 3.65 | 0.280 | 4.50 | 4.10 | 1.57 | 1.16 | 0.80 |
| 3 | | 1.61 | | 1.22 | 2.03 | 0.267 | 4.75 | 4.00 | 1.30 | 0.99 | 0.84 |

SDF = Spray drier feed

TABLE 2

| Example | Time (min) | Wt % in Melt | | Melt Cell Analysis | | | $Cl_2$ lbs/hr |
|---|---|---|---|---|---|---|---|
| | | $Fe_2O_3$ | Charcoal | %MgO | %Fe | %C | |
| 4 | 0 | | | 2.4% | 0.42 | 3.16 | 90 |
| | +15 | 0.66 | 0.66 | | | | 90 |
| | +30 | 0.66 | 0.66 | | | | 90 |
| | +40 | | | 0.77 | 0.84 | 3.82 | 90 |
| | +50 | | | 1.43 | 1.17 | 4.17 | 90 |
| 5 | 0 | 0.66 | 0.66 | 1.92 | 0.68 | 0.43 | 78 |
| | +15 | 0.66 | 0.66 | 1.15 | 1.30 | 0.10 | 78 |
| | +30 | | | 0.58 | 1.67 | 0.30 | 78 |

We claim:

1. A process for purification of magnesium chloride, comprising:

a. adding ferrous chloride to an aqueous magnesium chloride solution;

b. drying said magnesium chloride solution to form substantially anhydrous magnesium chloride containing minor amounts of magnesium oxide and water;

c. adding to said dried magnesium chloride a first carbon source comprising a highly reactive carbon source and a second carbon source comprising a carbon source which is less reactive than said first carbon source, said first carbon source having a lower specific gravity than said second carbon source such that said first carbon source is disposed on top of and said second carbon source is dispersed throughout the magnesium chloride upon melting said magnesium chloride, d. melting said dried magnesium chloride to form molten magnesium chloride, said magnesium chloride reacting with said water to form magnesium oxide and HCl; and e. passing chlorine gas through said molten magnesium chloride to react with magnesium oxide to form magnesium chloride.

2. The process of claim 1, wherein: said first carbon source is added to said dried magnesium chloride in an amount ranging from about 0.8% to 2.3% by weight of said dried magnesium chloride.

3. The process of claim 2, wherein: said first carbon source comprises charcoal.

4. The process of claim 1 wherein: said second carbon source is added to said dried magnesium chloride in an amount ranging from about 0.8% to 2.3% by weight of said dried magnesium chloride.

5. The process of claim 4, wherein: said second carbon source comprises calcined petroleum coke.

6. The method of claim 5, wherein: said iron is maintained from about 0.7% to 0.95% by weight in said molten magnesium chloride by periodically adding a mixture of iron oxide and charcoal to said molten magnesium chloride.

7. The process of claim 1, wherein: ferrous chloride is added to said aqueous magnesium chloride solution in an amount sufficient to provide from about 1.0% to 2.2% by weight of iron in said dried magnesium chloride.

8. The process of claim 7, wherein: said ferrous chloride is added to said aqueous magnesium solution in an amount sufficient to provide from about 1.4% to 1.8% by weight of iron in said dried magnesium chloride.

9. The process of claim 1, wherein: said ferrous chloride comprises an aqueous ferrous chloride solution.

10. The process of claim 1, wherein: said ferrous chloride comprises solid hydrated $FeCl_2$.

11. The process of claim 1, wherein: said magnesium chloride solution is dried by spray drying.

12. The method of claim 1 which further comprises: maintaining the amount of iron contained in said molten magnesium chloride from about 0.7% to 0.95% by weight during the step of passing chlorine gas through said molten magnesium chloride.

13. A process for the purification of magnesium chloride, comprising:

a. adding ferrous chloride to an aqueous magnesium chloride solution in an amount sufficient to provide from about 1.0% to 2.2% by weight of iron following drying of said magnesium chloride solution;

b. spray drying said magnesium chloride solution to form a substantially anhydrous magnesium chloride containing minor amounts of magnesium oxide and water;

c. adding from about 0.8% to 2.3% by weight of charcoal and from about 0.8% to 2.3% by weight of calcined petroleum coke to said dried magnesium chloride such that said charcoal is disposed on top of and said petroleum coke is dispersed throughout the magnesium chloride upon melting said magnesium chloride;

d. melting said dried magnesium chloride to form molten magnesium chloride, said magnesium chloride reacting with said water to form magnesium oxide and HCl; and e. passing chlorine gas through said molten magnesium chloride to react with magnesium oxide to form magnesium chloride.

14. The process of claim 13, wherein: ferrous chloride is added to said aqueous magnesium chloride solution in an amount sufficient to provide from about 1.4% to 1.8% by weight of iron following drying of said magnesium chloride solution.

* * * * *